US007572067B1

(12) United States Patent
Hudgins

(10) Patent No.: US 7,572,067 B1
(45) Date of Patent: Aug. 11, 2009

(54) PARALLEL OPTICAL CONNECTOR

(75) Inventor: Clay E. Hudgins, Edgewood, NM (US)

(73) Assignee: Emcore Corporation, Albuquerque, NM (US)

( * ) Notice: Subject to any disclaimer, the term of this patent is extended or adjusted under 35 U.S.C. 154(b) by 0 days.

(21) Appl. No.: 12/019,472

(22) Filed: Jan. 24, 2008

(51) Int. Cl.
*G02B 6/36* (2006.01)
(52) U.S. Cl. .............................. 385/89; 385/53; 385/88; 385/90; 385/92
(58) Field of Classification Search ............... 385/88–94
See application file for complete search history.

(56) References Cited

U.S. PATENT DOCUMENTS 6,712,527 B1 * 3/2004 Chan et al. .................... 385/88
2006/0177184 A1 * 8/2006 Basavanhally et al. ........ 385/89

* cited by examiner

*Primary Examiner*—Tina M Wong

(57) ABSTRACT

A connector for establishing a connection for use in a optical communications network, the connector comprising a plurality of optical elements, said optical elements being VCSELs, photodetectors or optical fibers, said optical elements being arranged in two or more arrays so that at least one of the arrays is moveable to ensure alignment of the members of that array when the connection is established.

19 Claims, 10 Drawing Sheets

PARALLEL OPTICAL CONNECTOR

FIELD OF THE INVENTION

This invention relates to connectors for establishing optical communication links and, in particular, optical connector systems for establishing optical communication links between a parallel array of optical light emitters and/or photodetectors and a parallel array of fiber optic cables.

BACKGROUND OF THE INVENTION

In optical communication systems information is transmitted in the form of modulated light beams through an optical transmission medium such as an optical fiber. The optical signals are produced by a modulated light source which may, for example, be a LED or a laser, and are detected at the receiving end by photodetectors. The present invention is concerned with connectors where such light sources and/or photodetectors are coupled to optical fibers.

Advances in technology have resulted in light sources, photodetectors and optical fibers having relatively small cross-sections. It is therefore important when establishing a connection between such a light source or photodetector and an optical fiber that the fiber be correctly aligned with respect to the light source. Misalignment can result in attenuation of the power of the signal transmitted through the optical fiber or a complete break in communication.

Connectors for establishing a connection between light sources or photodetectors and fiber optic cables may involve an array of light sources or photodetectors and an array of optical fiber cable ends. The connector acts by aligning the arrays. Certain of these kinds of connectors establish connections between two arrays of light sources and photodetectors and two corresponding arrays of optical fiber ends. It has been found however that the manufacturing tolerances in producing such connectors result in misaligned arrays when the connection is established.

It is an object of the invention to address the aforementioned deficiencies.

SUMMARY OF THE INVENTION

In accordance with a first aspect, the invention provides an optical connector for establishing a connection for use in a fiber optic network, said connector comprising a plurality of optical coupling arrays, said arrays comprising light emitters and/or light detectors, or fiber optical cable ends, said arrays being arranged for movement relative to one another.

Relative movement of the arrays ensures that when an optical connection is established, all of the of the arrays may be properly aligned. This avoids loss or attenuation in signals which pass through the connection due to misaligned arrays.

The movement of the optical connectors may be provided by a void, or by appropriate flexible material surrounding the array.

Preferably, the connector includes registration element associated with each array to ensure that the corresponding array is properly aligned when a connection involving that array is made.

A further aspect of the invention extends to a connection system comprising at least two mating connectors, wherein one of said connectors includes at least two optical arrays mounted for movement relative to one another. The first connector may comprise optical arrays of lasers and/or photodetectors, and the second connector may comprise parallel arrays of fiber optic cables. The fiber optic cables may form part of a fiber optic ribbon cable.

Preferably the second connector is provided with separately movable ribbon cable arrays. Therefore, in a connector system comprising both emitter/photodetector and fiber optic connectors, it is preferable that the ribbon cable arrays be mounted for both linear and angular movement or displacement with respect to one another.

Preferably the movement of the array relative to the connector is less than 5 mm in its linear extent. Further preferably the movement is less than 2 mm in its linear extent. By limiting the movement, failure of the respective connector attributable to excessive movement resulting in structural weaknesses may be minimized.

BRIEF DESCRIPTION OF THE DRAWINGS

Specific embodiments of the invention will now be described with reference to the accompanying drawings, in which.

DESCRIPTION OF PREFERRED EMBODIMENTS

Figure 1:
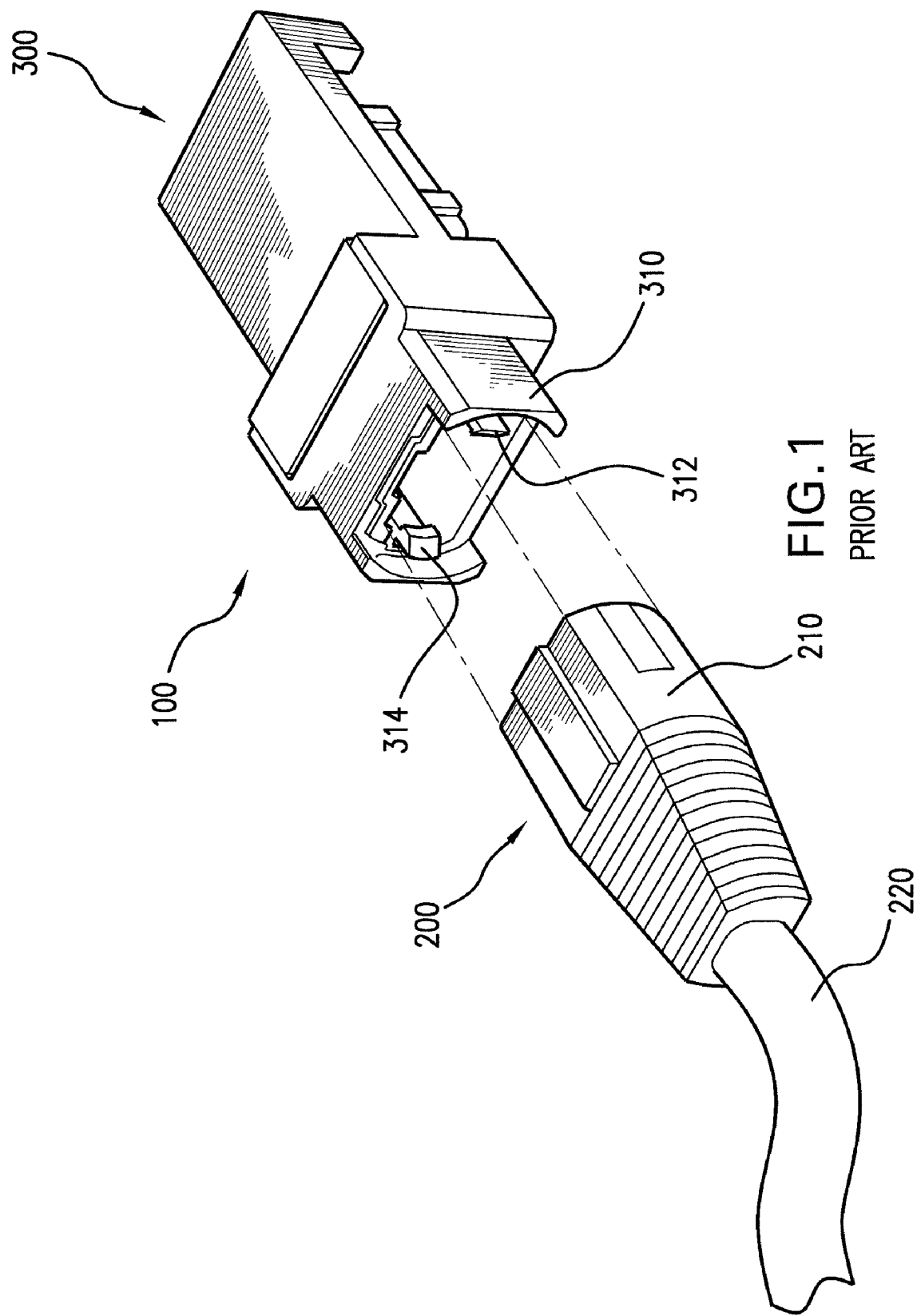
FIG. 1 is a perspective view of a known optical connector system.

FIG. 1 illustrates an optical connector system 100 known in the art. The optical connector system 100 includes a fiber optic connector 200 which engages with an optical transceiver 300. As described below in greater detail, the transceiver 300 comprises light sources and photodetectors and the fiber connector 200 comprises fiber optic cables. The connector system functions to establish a connection between these optoelectronic devices and fiber optic cables.

The fiber optic connector 200 comprises a sleeve 210 connected to the ribbon cable 220. The sleeve 210 therefore acts to anchor the fiber optic connector 200 to the ribbon cable 220. At one end of the transceiver 300 there is provided a locking portion 310 having two snap-fit hooks 312 and 314 which engage with corresponding formations provided on the fiber optic connector 200 (not shown in FIG. 1) to ensure that the fiber optic connector 200 securely connects with the transceiver 300.

Figure 2A:
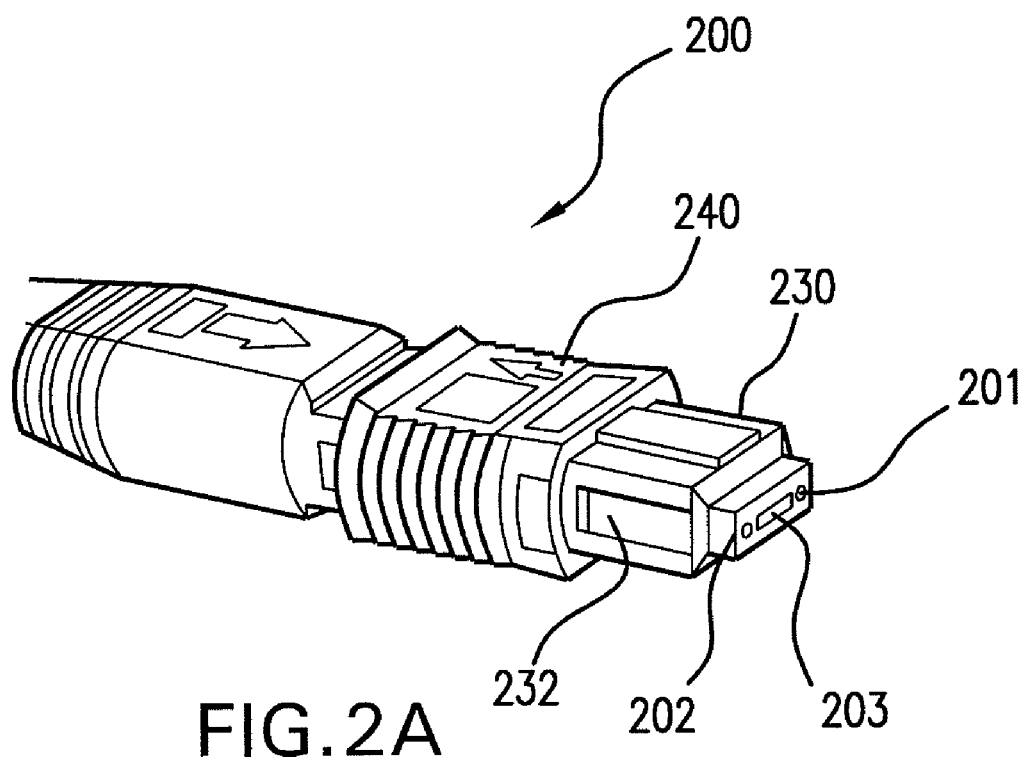
FIG. 2A is a perspective view of a fiber optic connector of the optical connector system of FIG. 1.

FIG. 2A illustrates the fiber optic connector 200 of FIG. 1 in greater detail. The fiber optic connector 200 (shown here without sleeve 210) includes a mounting 240 which supports, and to which is mounted, a fiber optic front-end 230. The fiber optic front-end 230 is formed with two receptacles (only one of which, receptacle 232, is shown in FIG. 2A, the other receptacle being located at a diametrically opposed position to receptacle 232). These receptacles receive the snap-fit hooks 312 and 314 of the emitter connector 300 (FIG. 1) to form the connection between fiber optic connector 200 and transceiver 300. Fiber optic ribbon cable 220 (not shown in this Figure) comprises a set of fiber optic strands, the ends of which are arranged in an optical fiber array 203. The optical fiber array 203 is mounted on the front-end 230. Two sockets 201 and 202 are formed in the fiber optic front-end 230 and are provided to either side of the optical fiber array 203.

Figure 2B:
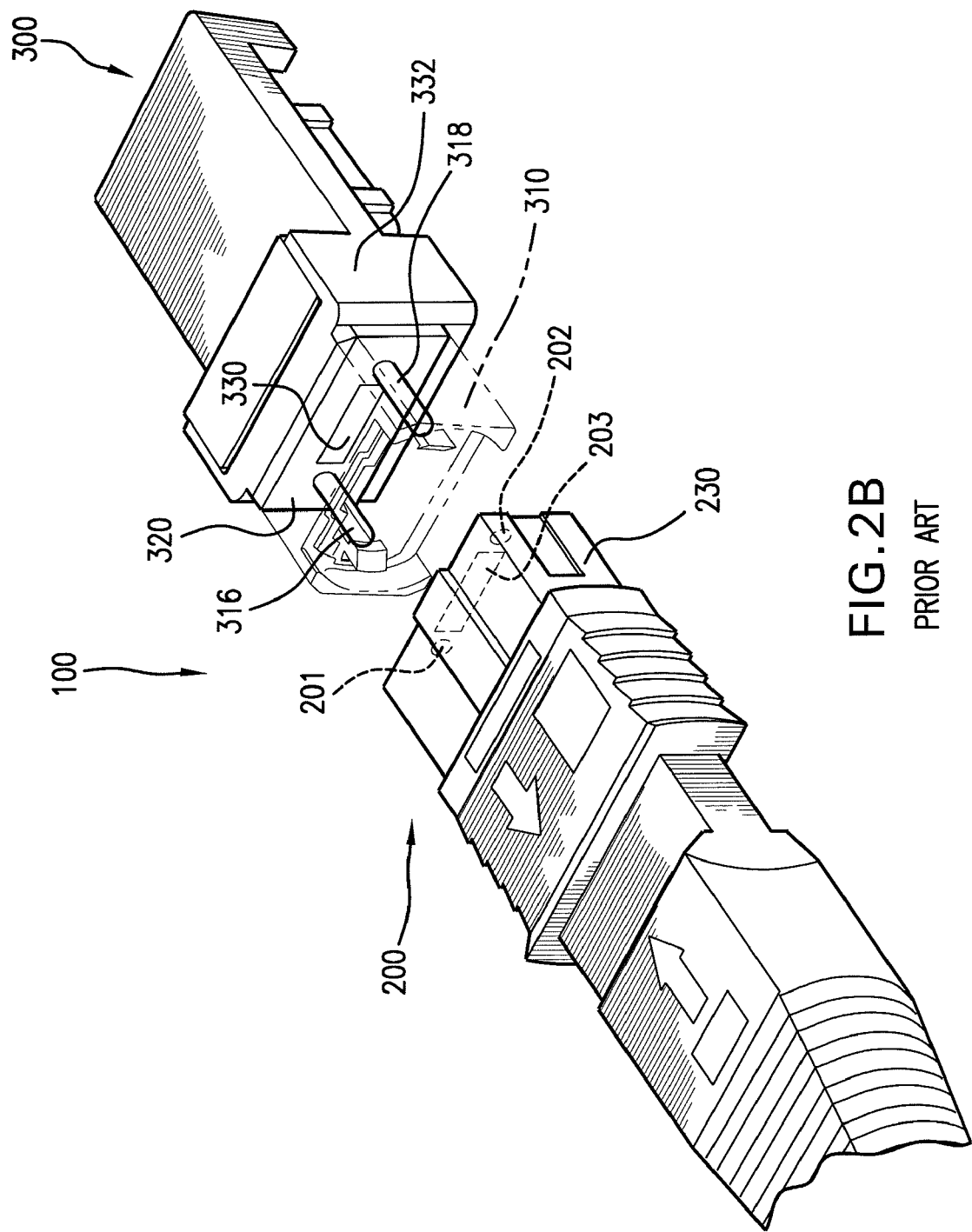
FIG. 2B is a perspective view of a detail of the optical connector system of FIG. 1.

FIG. 2B illustrates a detail of the known optical connector system 100 of FIG. 1. The transceiver 300 of connector system 100 includes an array 330 of vertical cavity surface emitting lasers (VCSELs). The array 330 is mounted in and supported by array support 320 which is part of emitter connector front-end 332. Disposed on either side of the array 330 are two pins 316 and 318 connected to array support 320. When the transceiver 300 engages with the fiber optic connector 200, pins 316 and 318 engage with respective sockets 201 and 202. This ensures that the optoelectronic devices of array 330 will align with the fiber optic array 203 so that light beams associated with the VCSELs or detectors of array 330 will be received and transmitted by the optical fibers of array 203 without significant attenuation in the power of the light beams.

Figure 3:
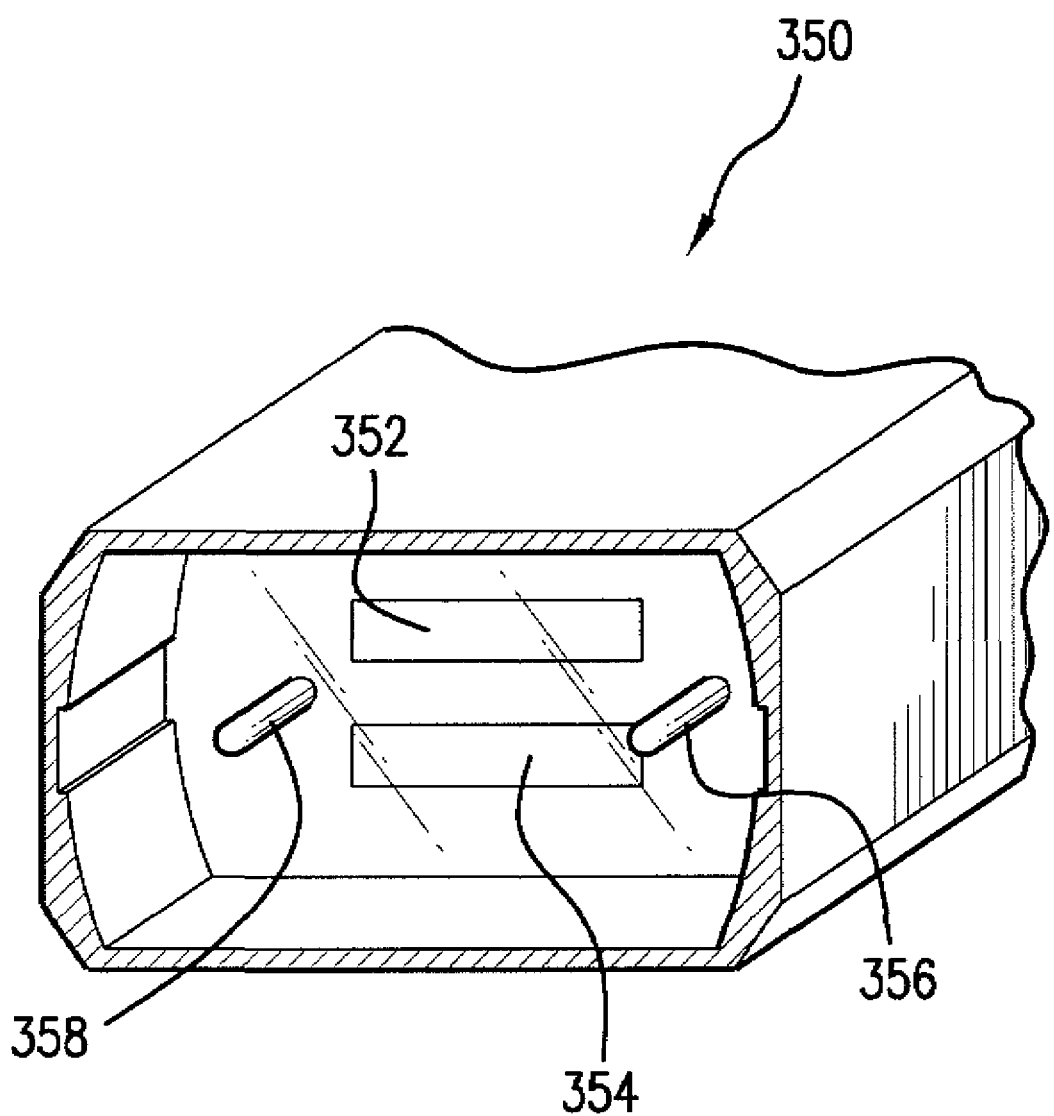
FIG. 3 is a perspective view of a portion of a further known emitter.

FIG. 3 illustrates a further emitter connector 350 known in the art. Emitter connector 350 includes two arrays 352 and 354 (e.g. emitters and detectors) which operate in parallel, increasing the throughput of the connection established by the connector 350 in comparison to that established with the connection system 100 of FIG. 1. Emitter connector 350 includes pins 356 and 358 to ensure alignment of each of the arrays 352 and 354 with corresponding fiber optic arrays. However, the problem of alignment is significantly exacerbated where two arrays are involved, and it has been found that the arrangement illustrated in FIG. 3 provides insufficient registration for alignment between the optoelectronic devices of the arrays 352 and 354 and the optical fiber ends of corresponding fiber optic arrays.

Figure 4:
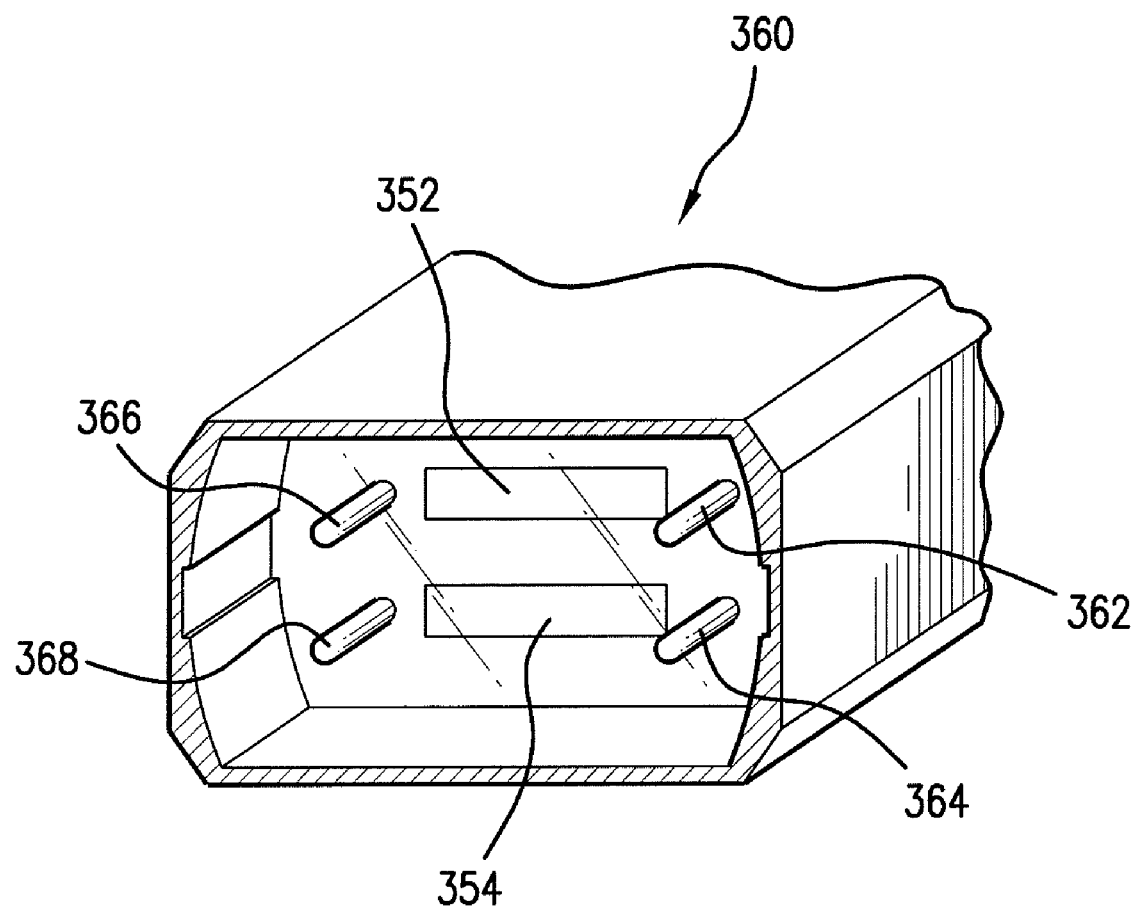
FIG. 4 is a perspective view of a portion of a further known emitter connector.

FIG. 4 illustrates a further transceiver connector 360 known in the art. Similar to the transceiver connector 350 illustrated in FIG. 3, connector 360 includes two arrays 352 and 354. However, to improve alignment, connector 360 is provided with four pins 362, 364, 366 and 368. As illustrated in greater detail in FIG. 5, the connector 360 connects to a fiber optic connector 380 to form optical connector system 500. Optical connector system 500 is illustrated in further detail in FIG. 6. As illustrated in FIG. 6, the fiber optic cable connector 380 is provided with two fiber optic cable arrays 382 and 384 with corresponding sockets 390 and 392 disposed on either side of fiber optic array 382, and sockets 394 and 396 disposed on either side of fiber optic array 384. When the connector 360 engages with the fiber cable connector 380 the pins 362, 364, 366 and 368 engage with respective sockets 392, 394, 390 and 396.

However, it has been found that the structure described above and illustrated in FIGS. 5 and 6 provides insufficient alignment between the VCSELs of the VCSEL arrays, and the photodetectors of the photodetector array, and corresponding fiber optic ends of the fiber optic cable arrays. Manufacturing tolerances for such a connector system exceed the required accuracy for establishing efficient optical connections.

Figure 7:
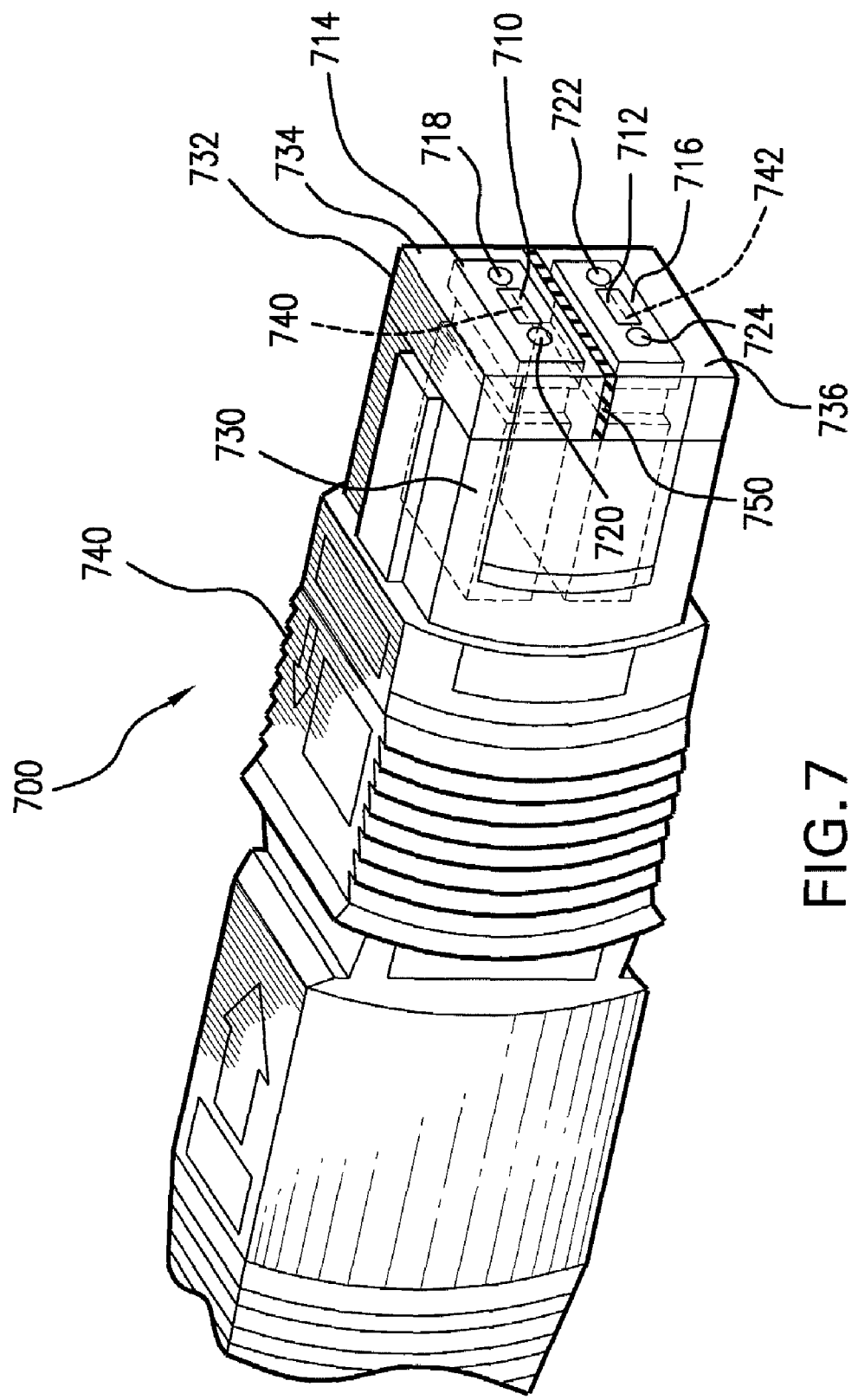
FIG. 7 is a perspective view of a fiber optic connector according to a first embodiment of the invention.

FIG. 7 illustrates a fiber optic cable connector 700 according to a preferred embodiment of the invention. Connector 700 includes fiber optic module 730 attached to a mounting 740. Although not illustrated in FIG. 7, the mounting 740 is attached to a fiber optic ribbon cable in the manner illustrated with respect to the fiber optic module 200 of FIG. 1.

The fiber optic module 730 includes a module front-end 732. Module front-end 732 comprises upper half-cap 734 and lower half-cap 736. Upper half-cap 734 includes a fiber optic array 710 mounted in a fiber optic array support 714. Similarly, lower half-cap 736 includes fiber optic array 712 mounted in fiber optic array support 716. Lines 740 and 742 show horizontal center lines for the respective fiber optic arrays 710 and 712. Disposed on either side of fiber optic arrays 710 and 712 are respective pairs of sockets: 718 and 720; and 722 and 724. A flexible member 750 is provided between upper half-cap 734 and lower half-cap 736.

Figure 5:
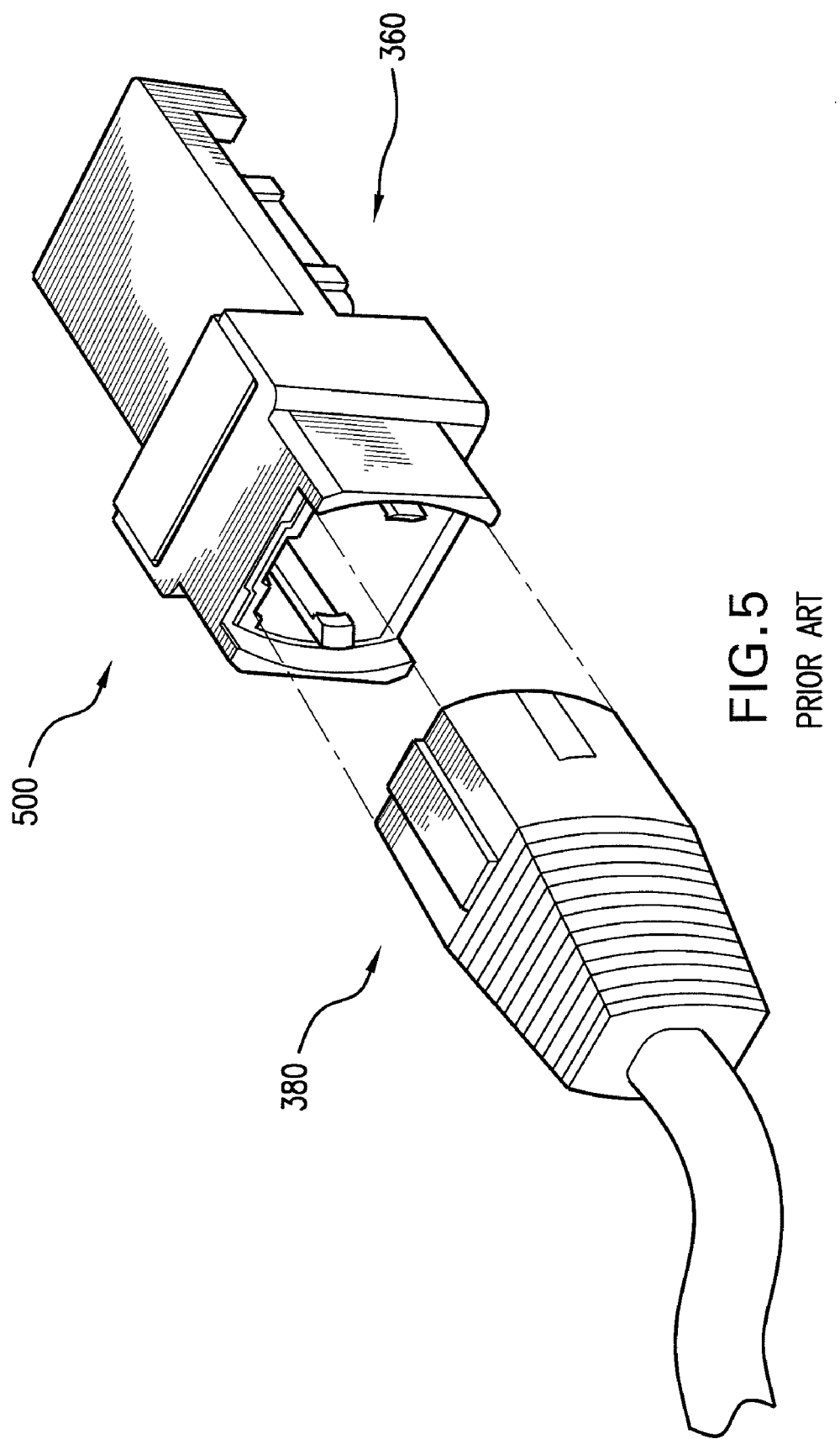
FIG. 5 is a perspective view of a known optical connector system incorporating the emitter connector illustrated in FIG. 4.
Figure 6:
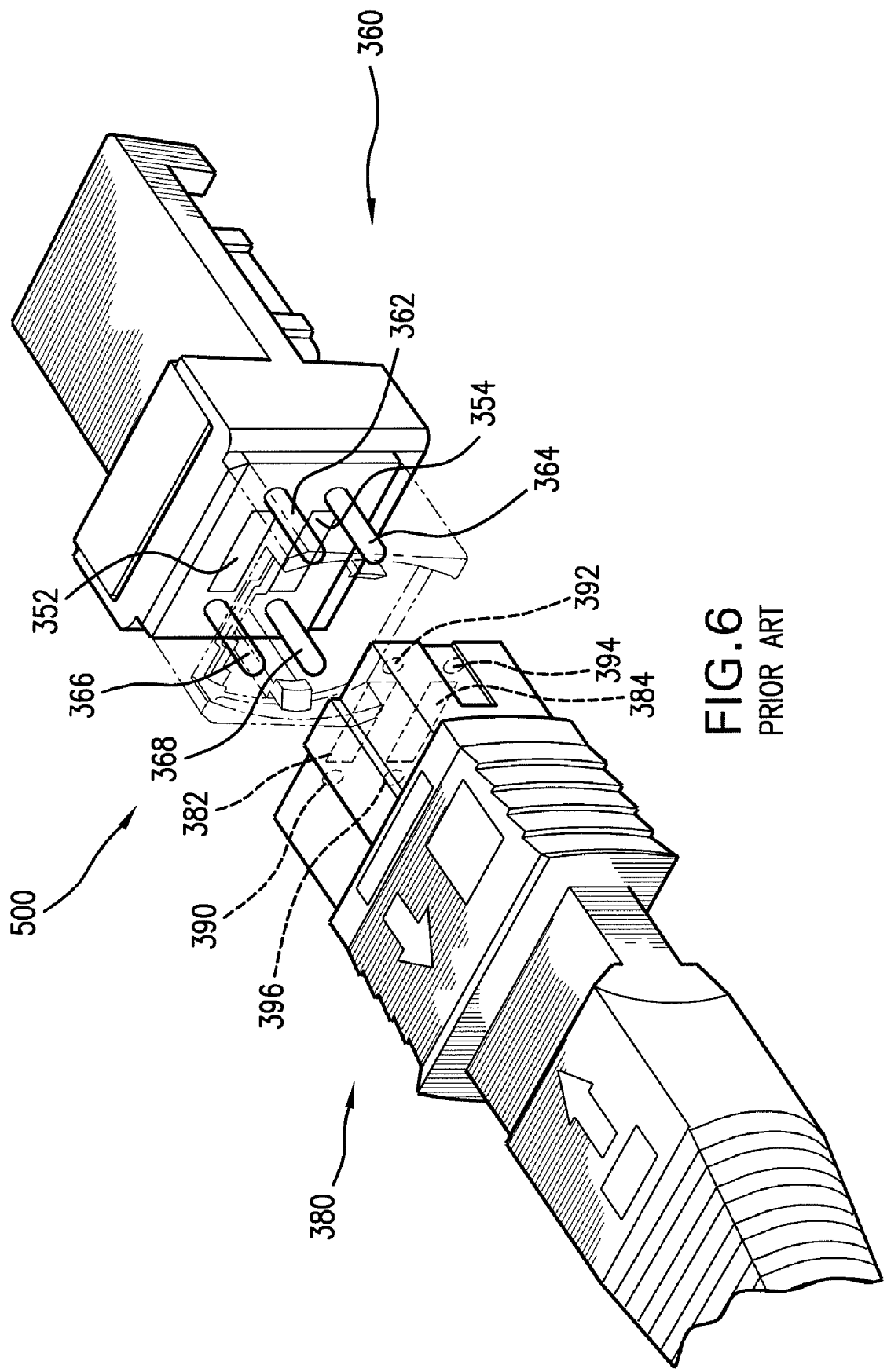
FIG. 6 is a perspective view of a detail of the optical connector system of FIG. 5.

The fiber optic connector 700 may be utilized with the connector 360 illustrated in FIGS. 5 and 6. In use, when the fiber optic connector 700 is engaged with connector 360, the pins 362 and 366 will engage with sockets 720 and 718 to ensure that the VCSEL array 352 aligns with optical fiber array 710. Similarly, pins 368 and 364 of the emitter connector 360 engage with sockets 722 and 724 to ensure that the photodetector array 354 aligns with optical fiber array 712. The pins and sockets provide registration element to ensure that the respective pairs of VCSELs/photodetectors and optic fiber arrays are aligned. The flexible member 750 provides a limited degree of movement between upper half-cap 734 and lower half-cap 736 which, in turn, provides a degree of movement between the two optical fiber arrays 710 and 712. Therefore when the optical fiber connector 700 engages with the emitter connector 360, accurate alignment between the respective arrays is ensured.

In the embodiment herein described a pin and socket arrangement such as pins 368, 364 and sockets 722, 724 provide a registration element. As the pins engage with the respective sockets, the arrays will move (as provided for by the flexible members) to provide the required connection between the arrays. Although pins and sockets have been described herein as the means by which the arrays are aligned, other means may other be used. In its simplest form this registration may be provided by any two engaging members where one of the members is attached to the VCSEL/photodetector array (preferably by means of the array support) and the other member to the fiber optic array (preferably also by means of the array support). In a more complex arrangement, registration is provided by interengaging members such as the snap-fit members previously described or by a guide member which engages with each one of the arrays of corresponding pairs (by means of the array support or otherwise). In a further embodiment, both the VCSEL/photodetector array and the corresponding fiber optic array are mounted for movement. In this case the registration may be provided as previously described.

The flexible member 750 of FIG. 7 is disposed and constructed so that the movement of fiber optic array 710 relative to fiber optic array 712 is constrained to a total linear movement of 2 mm from a rest position (defined by movement of respective center lines 740 and 742). In practice, manufacturing tolerances will vary this degree of relative movement so that certain fiber optic connectors constructed in accordance with the invention may display a linear movement of 4 mm.

Figure 8:
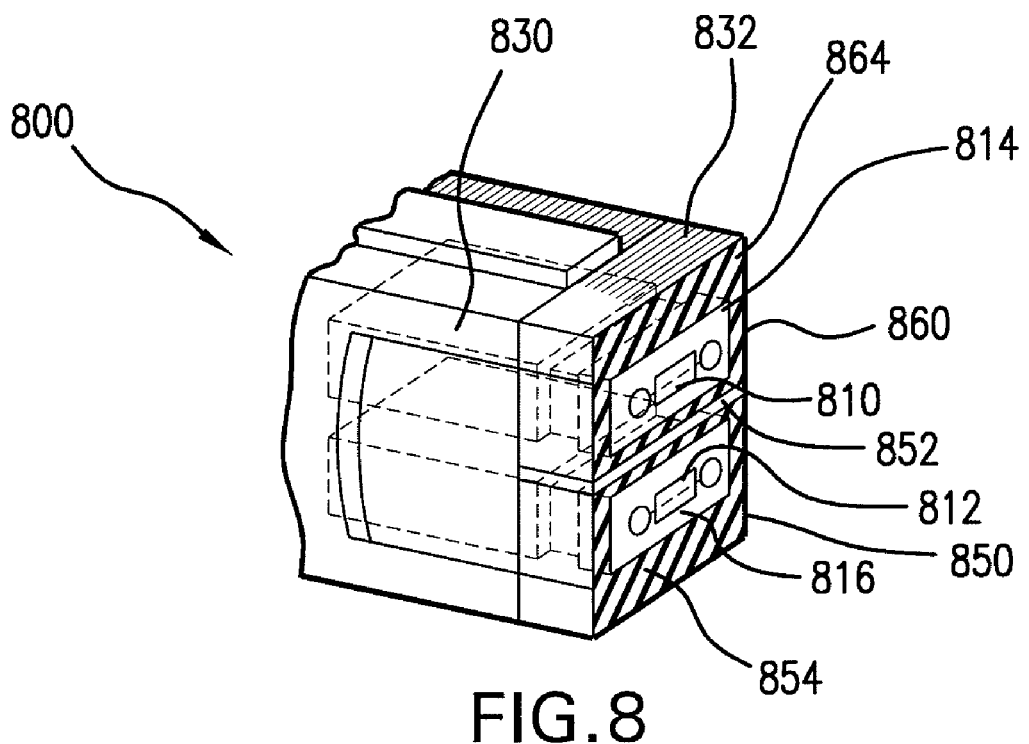
FIG. 8 is a perspective view of a fiber optic connector according to a second embodiment of the invention.

FIG. 8 illustrates a further embodiment of the invention. Fiber optic connector 800 comprises a module 830 having a module front-end 832. Front-end 832 comprises upper half-cap 860 and lower half-cap 850. The half-caps 850 and 860 differ from those illustrated in FIG. 7 (732 and 734) in that the half-caps 850 and 860 each include a respective flexible material member 854 and 864 surrounding respective fiber optic array supports 814 and 816. A rigid support member 852 is attached to the flexible material members 854 and 864 and to module 830. The flexible members 854 and 864 therefore allow the fiber optic arrays 810 and 812 to move relative to one another and relative to the rigid support member 852.

Figure 9:
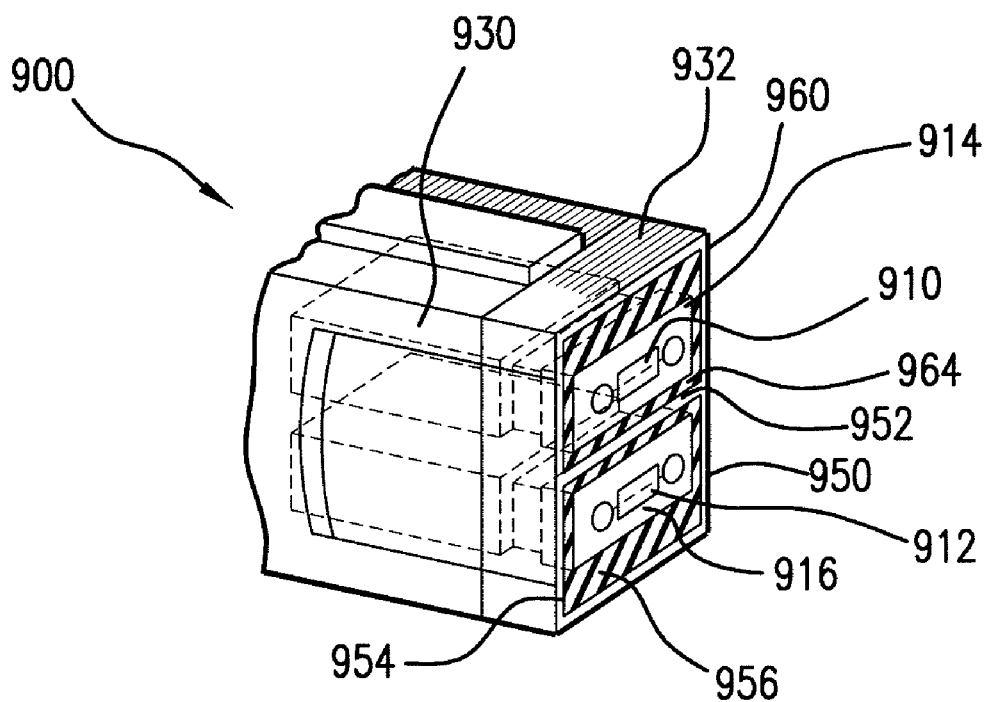
FIG. 9 is a perspective view of a fiber optic connector according to a third embodiment of the invention.

FIG. 9 illustrates a fiber optic connector 900 according to a further embodiment of the invention. Fiber optic connector 900 includes a fiber optic module 930 having a front-end 932. Front-end 932 includes half end-caps 950 and 960. Upper half-cap 960 includes a fiber optic array 910 mounted in fiber optic array support 914. Lower half-cap 950 includes a fiber optic array 912 mounted in fiber optic array support 916.

The embodiment of FIG. 9 differs from that illustrated in FIG. 8 in that the fiber optic connector 900 includes a rigid frame structure 954 disposed around an outer periphery of the front-end 932. The frame structure 954, together with a rigid support member 952 (which is located centrally within the front-end 932, and which corresponds to the rigid support member 852 of the embodiment of FIG. 8), define respective receptacles for flexible members 956 and 964. The flexible members 956 and 964 allow the fiber optic arrays 910 and 912 to move relative to one another and relative to the flexible frame 954, and support member 952.

Figure 10:
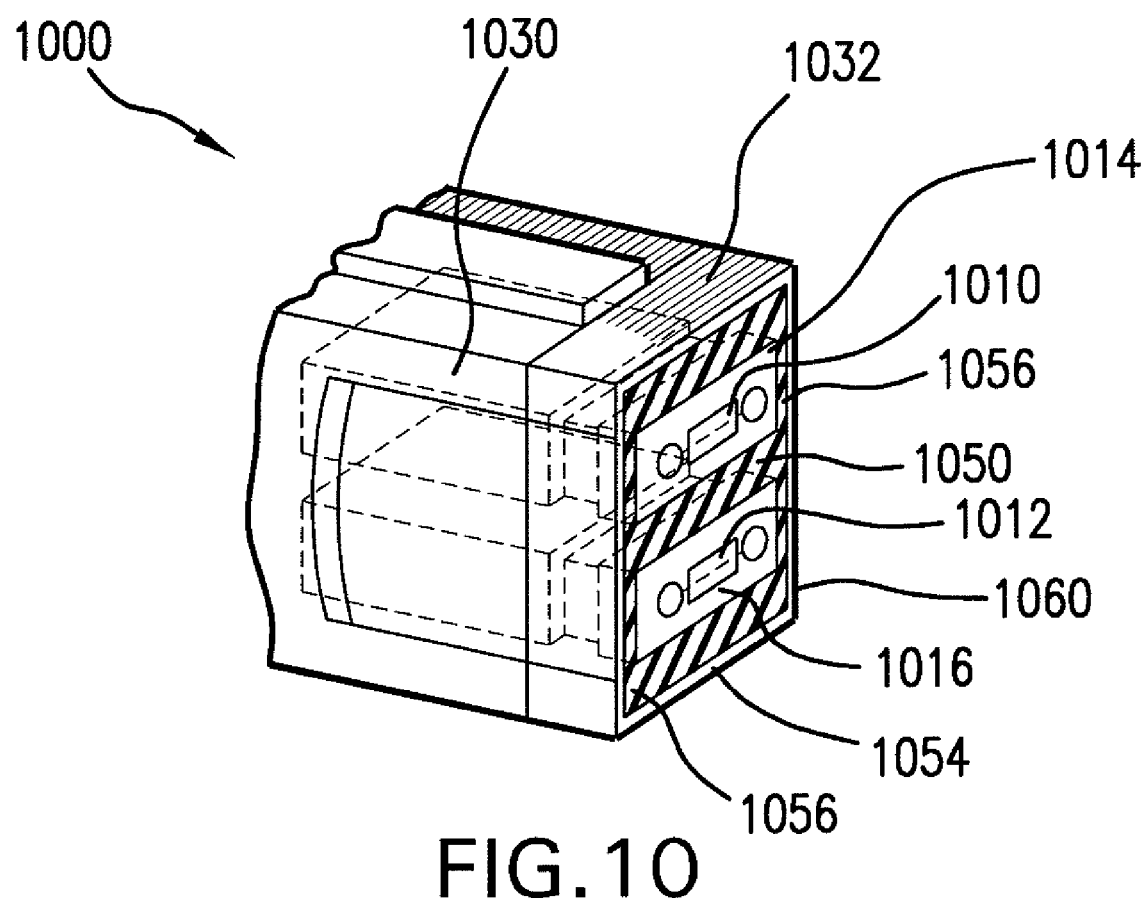
FIG. 10 is a perspective view of a fiber optic connector according to a fourth embodiment of the invention.

FIG. 10 illustrates a fiber optic connector 1000 according to a further embodiment of the invention. Fiber optic connector 1000 includes a fiber optic module 1030 having a front-end 1032. Front-end 1032 half end-caps 1050 and 1060. Upper half-cap 1060 includes a fiber optic array 1010 mounted in fiber optic array support 1014. Lower half-cap 1050 includes a fiber optic array 1012 mounted in fiber optic array support 1016.

The fiber optic connector 1000 includes a rigid frame structure 1054 disposed around an outer periphery of the front-end 1032. The frame structure 1054 defines a receptacle within which flexible members 1056 and 1064 are housed. As with previous embodiments, the flexible member 1056 and 1064 provide movement of the fiber optic arrays 1010 and 1012 relative to one another and relative to the frame structure 1054. In an alternative embodiment, the flexible members 1056 and 1064 may be replaced by a single flexible member.

The embodiment illustrated in FIG. 10 differs from that illustrated in FIG. 9 in that it lacks a support member corresponding to rigid support member 952.

In each of the aforementioned embodiments one or more flexible members is provided to allow movement of two fiber optic arrays relative to one another. Changes to the above embodiments are possible and within the scope of the invention. For example, the flexible member or members may be omitted altogether to provide a void instead. It will be realized that a void would also permit relative movement, albeit in a less controlled manner than provided by a flexible member. A person skilled in the art will realize that there are many materials suitable for constructing a flexible member such as foam, rubber etc.

It is further to be realized that the aforementioned embodiments have been described with reference to a connector which comprises arrays of optical fiber. However, the principles of the invention are equally applicable to a connector which alternatively or additionally includes other optoelectronic elements such as arrays of photodetectors and/or of optical emitters such as VCSELs. Similarly, the VCSEL arrays described above may equally be photodetectors arranged in arrays.

The invention claimed is:

1. An optical connector system, for coupling a plurality of optical fibers of an optical fiber ribbon cable to a plurality of opto-electronic devices, said optical connector system comprising:
   a first connector comprising two or more optoelectronic device arrays;
   a fiber optic connector comprising two or more optical fiber arrays, at least two of said optical fiber arrays corresponding to two of said optoelectronic device arrays, wherein said first connector is engageable with said fiber optic connector to establish a fiber optic connection; and
   a registration element associated with each pair of corresponding optical fiber arrays and opto-electronic device arrays, each registration element comprising a first part and a second part engageable with one another to align said optoelectronic device arrays with said corresponding optical fiber arrays when said first connector engages with said fiber optic connector, wherein at least two of said optical fiber arrays are mounted by a corresponding support member secured to the fiber optic connector, and a flexible member placed between said at least two of said optical fiber arrays in the fiber optic connector and configured to permit relative movement of said at least two of optical fiber arrays with respect to each other and relative to the support member, when said first connector engages with said fiber optic connector.

2. The optical connector system according to claim 1 where said movement is provided by a void.

3. The optical connector system according to claim 2 wherein said flexible support member is bonded to a frame structure.

4. The optical connector system according to claim 3 wherein said frame structure forms a receptacle to accommodate said flexible support member.

5. The optical connector system according to claim 1 further comprising at least two of said optoelectronic device arrays or two of said optical fiber arrays, wherein each array is mounted by a corresponding support member to permit movement of said optoelectronic device arrays or said optical fiber arrays.

6. The optical connector system according to claim 5 further comprising two flexible members, wherein movement of each array is provided by a corresponding flexible member relative to the support member.

7. The optical connector system according to claim 6 wherein said two flexible members are separated by a rigid frame member.

8. The optical connector system according to claim 1 wherein said movement of said at least one array is caused by said registration element.

9. The optical connector system according to claim 8 wherein said registration element comprises a pin and socket arrangement.

10. The optical connector system according to claim 8 wherein said movement extends less than 4 mm.

11. The optical connector system according to claim 1 wherein said optoelectronic devices include VCSELs.

12. The optical connector system according to claim 1 wherein said optoelectronic devices include photodetectors.

13. A connector for establishing an optical connection between optical emitters or optical detectors, and an optical fiber ribbon cable, said connector comprising: at least two arrays of optical elements, said optical elements being emitters, detector or fiber optic cables, at least one of said arrays being mounted within the connector for movement relative to other arrays of the connector so that, when said optical connection is established, said moveable array is configured to move within the connector to ensure alignment between said optical elements and corresponding optical elements required for said connection.

14. The connector according to claim 13 wherein said optical elements are fiber optic cables, VCSELs or photodetectors.

15. An optical connector system, for coupling a plurality of optical fibers of an optical fiber ribbon cable to a plurality of opto-electronic devices, said optical connector system comprising:
   a first connector comprising two or more optoelectronic device arrays;
   a fiber optic connector comprising two or more optical fiber arrays, at least two of said optical fiber arrays corresponding to two of said optoelectronic device arrays, wherein said first connector is engageable with said fiber optic connector to establish a fiber optic connection; and a registration element associated with each pair of corresponding optical fiber arrays and opto-electronic device arrays, each registration element comprising a first part and a second part engageable with one another to align said optoelectronic device arrays with said corresponding optical fiber arrays when said first connector engages with said fiber optic connector, wherein at least two of said optoelectronic device arrays are mounted by a corresponding support member secured to the first connector or, and a flexible member placed between said at least two of said optical fiber arrays in the fiber optic connector and configured to permit relative movement of said at least two of optoelectronic device arrays with respect to each other and relative to the support member, when said first connector engages with said fiber optic connector.

16. The optical connector system according to claim 15 wherein said flexible support member is bonded to a frame structure, and wherein said frame structure forms a receptacle to accommodate said flexible support member.

17. The optical connector system according to claim 15 further comprising at least two of said optoelectronic device arrays or two of said optical fiber arrays, wherein each array is mounted by a corresponding support member to permit movement of said optoelectronic device arrays or said optical fiber arrays.

18. The optical connector system according to claim 17 further comprising two flexible members, wherein movement of each array is provided by a corresponding flexible member relative to the support member.

19. The optical connector system according to claim 15 wherein said optoelectronic devices include VCSELs.

* * * * *